UNITED STATES PATENT OFFICE.

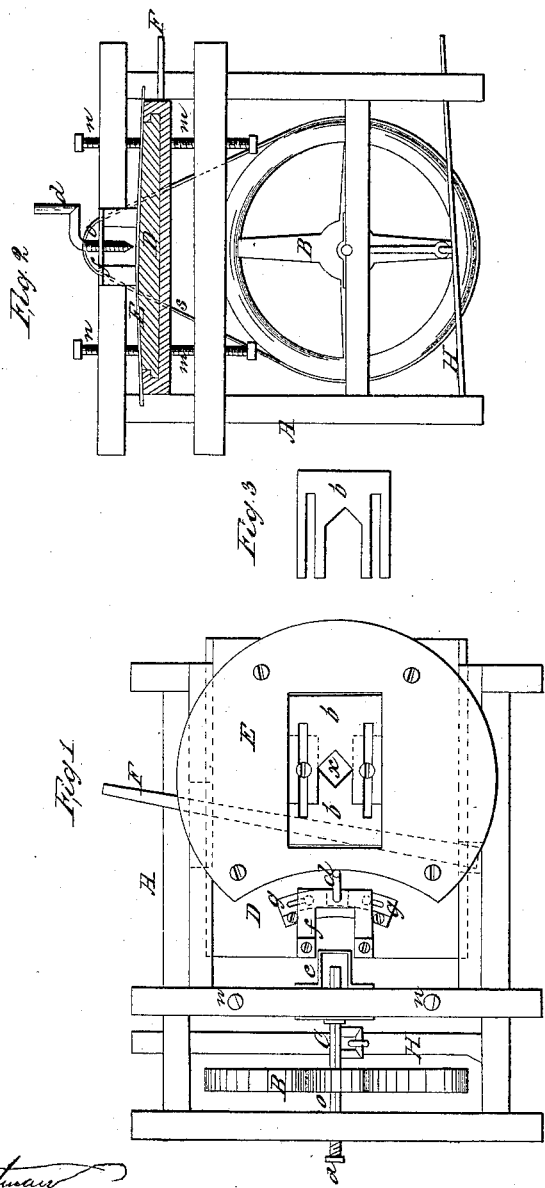

DAVID S. TROUT, OF ARCOLA, ILLINOIS.

IMPROVEMENT IN WHEELWRIGHTS' MACHINES.

Specification forming part of Letters Patent No. 59,683, dated November 13, 1866.

*To all whom it may concern:*

Be it known that I, DAVID S. TROUT, of Arcola, in the county of Douglas and State of Illinois, have invented certain new and useful Improvements in Wheelwrights' Machines; and do hereby declare that the following is a full, clear, and exact description thereof, reference being had to the accompanying drawings and the letters of reference marked thereon, making a part of this specification.

My invention consists in construction of certain parts and devices for the purpose of tenoning spokes and boring fellies.

In the annexed drawings, A represents a suitable frame, having a large wheel, B, supported in one end, and operated by a treadle, H. C represents the auger-shaft, which lies horizontally in the upper part of the frame above the wheel B. In the center of said shaft is a pulley, $o$, which is connected to the wheel B by means of the band $s$.

D represents the table upon which the work is accomplished. This table is supported above the frame by means of large screws, or their equivalents, by which means said table may be elevated or compressed, as desired. These screws are shown in Fig. 2 at $m$ $m$ and $n$ $n$.

Lying upon the top of the table is a metal plate, E, which is nearly in the form of a circle, to correspond with the wheel of the wagon. There is a large oblong hole through this plate, as well as through the table itself, (see $x$.) Placed within the opening in the plate are two clamps, which are of metal, and made in the form shown in Fig. 3. These clamps are provided with slots at each side, through which pass set-screws $z$ $z$, and allow them to be pushed from or brought near to each other and regulate the size of opening $x$, to secure the hub of the wagon-wheel.

The table-top is placed in grooves at each side of the table itself, and is worked back and forth in the grooves by means of a lever, F. This lever lies horizontally under the table-top, and is secured at the center by a screw, $y$, it being fastened in a slot at the side of the table.

The object of this movable table-top is to regulate the distance to or from the boring apparatus.

$f$ is a metal shield, which is bent above the table-top, and is provided with a hand-screw, $d$, to secure the fellies. There are also two segments, $g$ $g$, (connected by set-screws in slots,) directly beneath this screw, to assist the felly boring or tenoning and hold the parts operated upon in a perfectly stationary position.

Upon the inner end of the auger-shaft C is placed the auger for boring the fellies, or the hollow auger for tenoning the spokes. Any of the ordinary augers can be used on this invention, and the auger-shaft is kept in its place and can be adjusted by a screw, $a$, which it revolves around.

$c$ represents a metal guide, having an opening for the auger to pass, and which is bent around the end of the auger-shaft to attain exactness in the boring or tenoning.

It will be observed that the opening $x$ is exactly in the center of the plate E, so that the periphery of said plate will denote the correctness of the wheel.

Having thus fully described my invention, what I claim as new, and desire to secure by Letters Patent, is—

The arrangement of the adjustable reciprocating table D of a wheelwrights' boring-machine, the plate E, plates $b$ $b$, and segments $g$ $g$, when operated as and for the purposes described.

As evidence that I claim the foregoing I have hereunto set my hand in the presence of two witnesses.

D. S. TROUT.

Witnesses:
J. W. RICHARDS,
W. H. SPENCER.